US008668282B2

(12) United States Patent
Cho

(10) Patent No.: US 8,668,282 B2
(45) Date of Patent: Mar. 11, 2014

(54) INITIALIZING METHOD OF BRAKE-BY-WIRE SYSTEM IN VEHICLE

(75) Inventor: Bonggeun Cho, Busan (KR)

(73) Assignee: Hyundai Mobis Co., Ltd. (KR)

( * ) Notice: Subject to any disclaimer, the term of this patent is extended or adjusted under 35 U.S.C. 154(b) by 191 days.

(21) Appl. No.: 13/287,966

(22) Filed: Nov. 2, 2011

(65) Prior Publication Data

US 2012/0118681 A1 May 17, 2012

(30) Foreign Application Priority Data

Nov. 16, 2010 (KR) ........................ 10-2010-0113777

(51) Int. Cl.
*F16D 65/52* (2006.01)

(52) U.S. Cl.
USPC .................... 303/122.08; 303/20; 188/1.11 E

(58) Field of Classification Search
USPC ...... 303/155, 122.08, 20; 188/1.11 R, 1.11 E, 188/1.11 L
See application file for complete search history.

(56) References Cited

U.S. PATENT DOCUMENTS

| 5,366,280 | A * | 11/1994 | Littlejohn | 303/3 |
| 5,957,246 | A * | 9/1999 | Suzuki | 188/72.1 |
| 6,081,081 | A * | 6/2000 | Maisch | 188/162 |
| 6,422,663 | B1 * | 7/2002 | Siepker et al. | 303/191 |
| 6,536,562 | B1 * | 3/2003 | Bohm et al. | 188/156 |
| 7,464,996 | B2 * | 12/2008 | Saewe et al. | 303/89 |
| 8,041,475 | B2 * | 10/2011 | Fujita et al. | 701/30.3 |
| 8,239,100 | B2 * | 8/2012 | Ueno et al. | 701/45 |
| 8,249,791 | B2 * | 8/2012 | Baumgartner et al. | 701/80 |
| 2006/0186731 | A1 * | 8/2006 | Bach | 303/89 |
| 2009/0120742 | A1 | 5/2009 | Rauch et al. | |

FOREIGN PATENT DOCUMENTS

| JP | 2004-239324 A | 8/2004 |
| KR | 10-2009-0119486 A | 11/2009 |

* cited by examiner

*Primary Examiner* — Bradley King
(74) *Attorney, Agent, or Firm* — Knobbe Martens Olson & Bear LLP

(57) ABSTRACT

A brake-by-wire system uses a time sequence type that determines road conditions before initialization, initializes EWBs (Electro Wedge Brake) at the left/right front wheels and EMBs (Electro Mechanical Brake) at the left/right rear wheels with time differences on the basis of the determined road conditions. Therefore, the clamping force in at least any one of the EWBs and the EMBs is maintained in any circumstances, thereby avoiding a situation that all the braking force of a vehicle is removed.

14 Claims, 8 Drawing Sheets

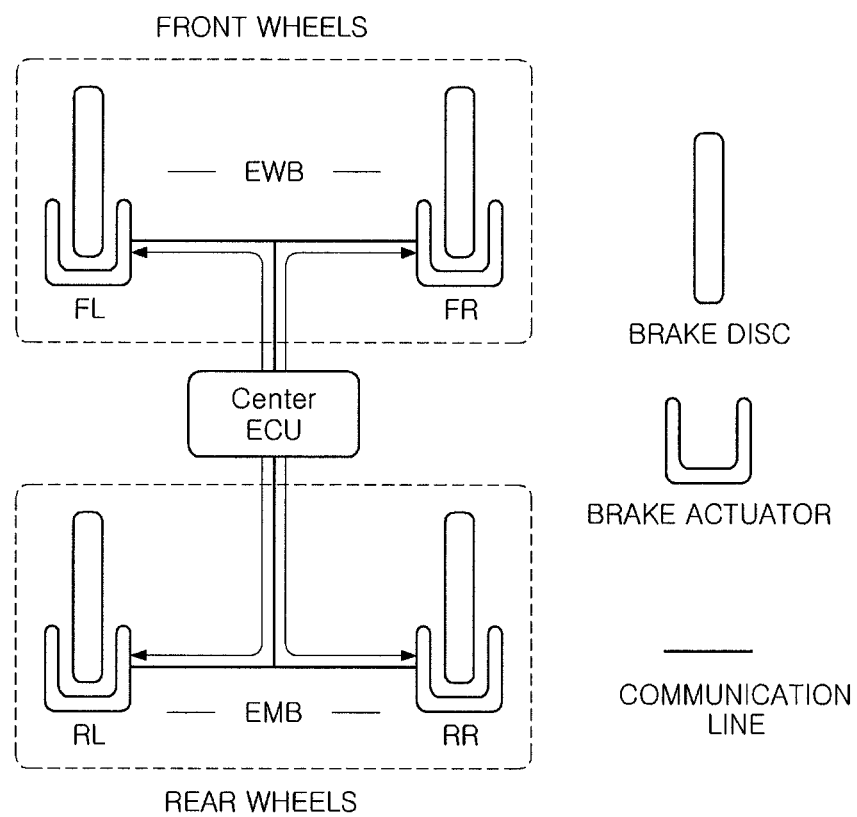

INITIALIZING METHOD OF BRAKE-BY-WIRE SYSTEM IN VEHICLE

CROSS-REFERENCE TO RELATED APPLICATIONS

The present application claims priority to Korean Patent Application Number 10-2010-0113777 filed Nov. 16, 2010, the entire contents of which application is incorporated herein for all purposes by this reference.

BACKGROUND

1. Field

The present disclosure relates to a brake-by-wire system, and more particularly, to initializing brakes of a brake-by-wire system in a vehicle.

2. Description of Related Art

In general, a BBW (Brake-by-wire System) of a vehicle operates to brake wheels without using hydraulic pressure.

An EMB (Electro Mechanical Brake) or an EWB (Electro Wedge Brake) is applied to the BBW, and in general, the EWB is applied to the front wheels and the EMB is applied to the rear wheels.

The EMB generates clamping force, using an actuator that uses high voltage of 42V and the EWB generates clamping force by self-energizing the power of an actuator in a wedge structure.

The clamping force means braking force of a vehicle which is generated between a pad and a wheel disc.

By using an actuator for the EWB and the EMB, as described above, an initializing process for diagnose breakdown of the actuator and keeping the air gap of a worn pad is performed to ensure braking stability.

In initializing, the actuator operates to the upper and lower limits of the operational range and the worn pad should be compensated to keep the initial air gap, and accordingly, high braking performance can be achieved, as compared with a hydraulic brake system.

The information disclosed in this Background section is only for enhancement of understanding of the general background of the invention and should not be taken as an acknowledgement or any form of suggestion that this information forms the prior art already known to a person skilled in the art.

SUMMARY

One aspect of the present invention provides an initializing method of a brake-by-wire system in a vehicle that allows a driver to keep controlling the vehicle even on a slope by preventing simultaneous loss of clamping force of all the wheels in an initializing process, by initializing EWB at the front wheels and EMB at the rear wheels, with a time sequence, in consideration of the known road conditions.

An embodiment of the present invention provides an initializing method of a brake-by-wire system equipped with EWBs (Electro Wedge Brake) at the left/right front wheels and EMBs (Electro Mechanical Brake) at the left/right rear wheels. The method is implemented by a time sequence type that determines initialization order of the EWBs and the EMBs with time differences on the basis of road conditions determined before the initialization, and do not simultaneously remove clamping force in the EWBs and the EMBs, which is generated before the initialization, in the initialization.

The time sequence type is a front wheel-rear wheel separate type that initializes the EMBs at the left/right rear wheels after finishing initializing the EWBs at the left/right front wheels, or initializes the EMBs and the EWBs in the opposite order, a front wheel-rear wheel X-type that initializes in a pair any one of the EWBs at the left/right front wheels and any one of the EMBs at the left/right rear wheels, and then initializes in a pair the other of the EWBs and the other of the EMBs, and a front wheel-rear wheel simultaneous type that simultaneously initializes the EWBs at the left/right front wheels and the EMBs at the left/right rear wheels.

When initialization is performed by the front wheel-rear wheel separate type, the EWBs at the left/right front wheels are initialized in the order of a step of moving forward wedges to generate clamping force due to contact between pads and wheel discs, a step of forward brake that checks operability of actuators by measuring the clamping force, a step of adjusting air gaps that compensate wear of the pads while the wedges that have been moved forward return, a step of backward brake that checks operability of the actuator by pulling backward the wedges after compensating the wear of the pads, and a step of finishing initialization that generates clamping force after moving backward the wedges and returning the wedges to a neutral position, and the EMBs at the left/right rear wheels are initialized in the order of a step of preparing initialization that releases a parking mechanism, a step of moving forward pistons to generate clamping force due to contact between pads and wheel discs after releasing the parking mechanism, a step of forward brake that checks operability of actuators by measuring the clamping force, a step of adjusting air gaps that compensates wear of pads while the pistons that have been moved forward return, and a step of finishing initialization that generates clamping force, with the pistons switched to a standby state, after the wear of the pads is compensated.

When initialization is performed by the front wheel-rear wheel X-type, one of the EWBs at the front wheels and one of the EMBs at the rear wheels which correspond to the EWB at the front wheel are initialized in the order of a step of moving forward a wedge by moving an actuator of the EWB to generate clamping force due to contact between the pad and the wheel disc, a step of initial movement that moves forward a piston by operating the actuator of the EWB to generate clamping force due to contact between the pad and the wheel disc after releasing a parking mechanism, a step of forward brake that checks operability of the actuator by measuring the clamping force, a step of adjusting an air gap that compensates wear of the pad while the wedge that has been moved forward returns and the piston that has been moved forward return, and a step of finishing initialization that checks operability of the actuator by pulling backward the wedge after compensating the wear of the pad, generates clamping force by returning the wedge to a neutral position, and generates clamping force, with the piston switched to a standby state, after compensating the wear of the pad, and the other of the EWBs at the front wheels and the other of the EMBs at the rear wheels which corresponds to the other of the EWBs at the front wheels are initialized in the same process.

When initialization is performed by the front wheel-rear wheel simultaneous type, the EWBs at the left/right front wheels are initialized in the order of a step of moving forward wedges to generate clamping force due to contact between pads and wheel discs, a step of forward brake that checks operability of actuators by measuring the clamping force, a step of adjusting air gaps that compensate wear of the pads while the wedges that have been moved forward return, a step of backward brake that checks operability of the actuator by pulling backward the wedges after compensating the wear of the pads, and a step of finishing initialization that generates clamping force after moving backward the wedges and returning the wedges to a neutral position, and the EMBs at the left/right rear wheels perform are initialized in the order of a step of preparing initialization that releases a parking mechanism, a step of moving forward pistons to generate clamping force due to contact between pads and wheel discs after releasing the parking mechanism, a step of forward brake that checks operability of actuators by measuring the clamping force, a step of adjusting air gaps that compensate wear of pads while the pistons that have been moved forward return, and a step of finishing initialization that generates clamping force, with the pistons switched to a standby state, after the wear of the pads is compensated.

Compensating the wear of the pad is implemented when the measured clamping force does not satisfy the clamping force according to a reference air gap.

A state for braking by a pedal is implemented after the step of finishing initialization.

The front wheel-rear wheel separate type and the front wheel-rear wheel simultaneous type are selectively performed in accordance with inclination conditions of a road in the initialization, and the initialization by the front wheel-rear wheel separate type and the front wheel-rear wheel simultaneous type are changed by an interrupt signal from the outside.

Since the system in accordance with embodiments of the present invention initializes the EWBs at the left/right front wheels and the EMBs at the left/right rear wheels with time differences, using a time sequence in consideration of road conditions checked in initialization, it is possible to prevent all the clamping force at the wheels of the vehicle from being simultaneously removed in the initialization.

Further, since the system in accordance with embodiments of the present invention prevents all the clamping force at the wheels of the vehicle from being simultaneously removed even in the initialization, particularly, it is possible to ensure stability for keeping the vehicle under the control of a driver, even on an inclined road, as on a level ground, such that it is possible to prevent the driver from feeling embarrassed or uneasy.

The methods and apparatuses of the present invention have other features and advantages which will be apparent from or are set forth in more detail in the accompanying drawings, which are incorporated herein, and the following Detailed Description of Embodiments, which together serve to explain certain principles and features of the present invention.

BRIEF DESCRIPTION OF THE DRAWINGS

FIGS. 6 to 8 are operational views of initializing a brake-by-wire system which is performed in accordance with the embodiment of the present invention.

Figure 1:
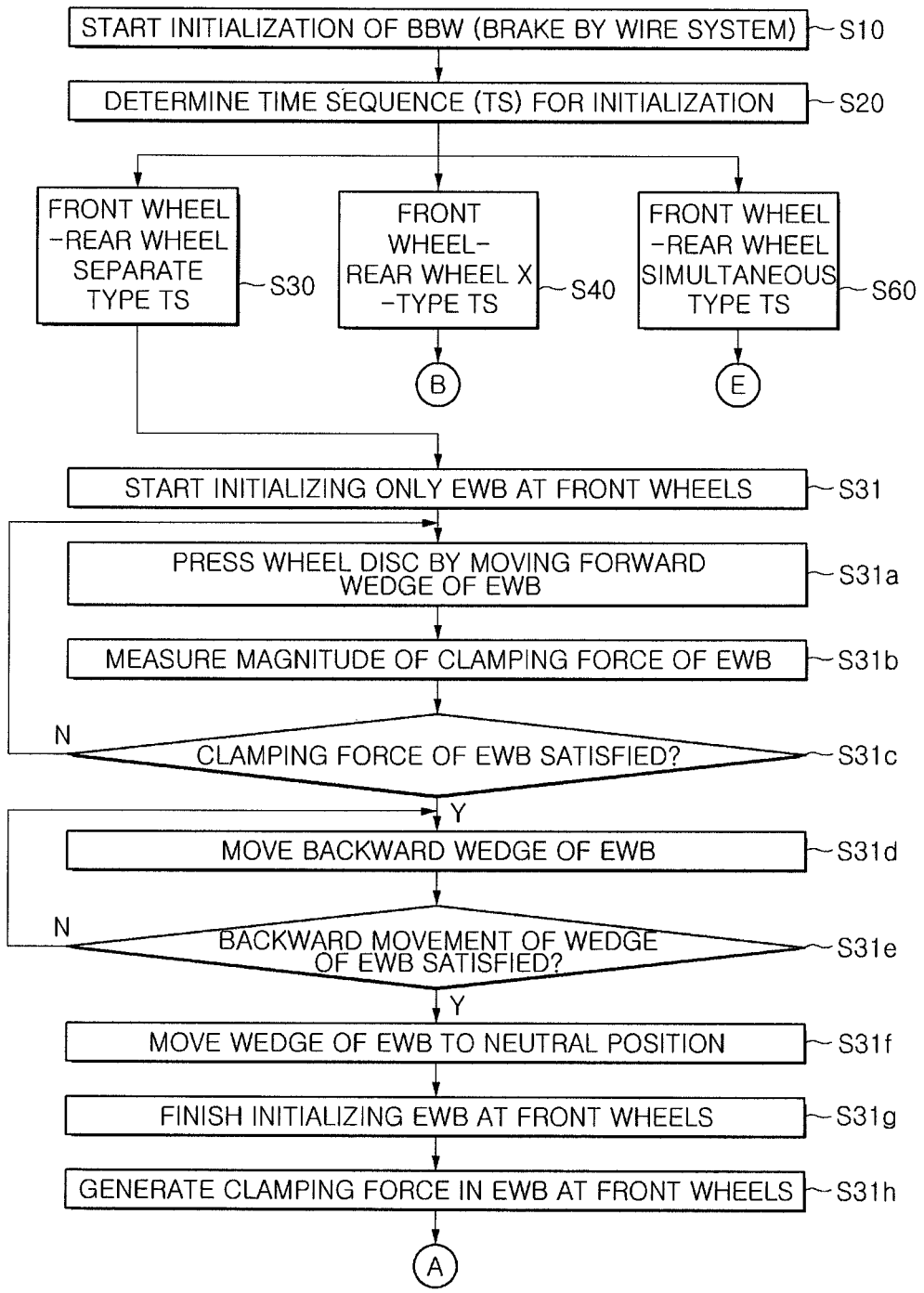
FIGS. 1 and 2 are front wheel-rear wheel separate type time sequence flowcharts in initializing the brake-by-wire system according to an embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of embodiments of the present invention throughout several figures of the drawing.

DETAILED DESCRIPTION OF EMBODIMENTS

Reference will now be made in detail to various embodiments of the present invention(s), examples of which are illustrated in the accompanying drawings and described below. While the invention(s) will be described in conjunction with embodiments, it will be understood that present description is not intended to limit the invention(s) to those embodiments. On the contrary, the invention(s) is/are intended to cover not only the embodiments, but also various alternatives, modifications, equivalents and other embodiments, which may be included within the spirit and scope of the invention as defined by the appended claims.

Embodiments of the present invention are described hereafter in detail with reference to the accompanying drawings, and the embodiments can be achieved in various ways by those skilled in the art and the present invention is not limited to the embodiments.

FIG. 8 illustrates an example of simultaneously operation of a front wheel and a rear wheel in initializing a BBW.

As shown in the figure, as the BBW is initialized, an ECU diagnoses breakdown of actuators and adjusts pad gaps while controlling EWBs mounted at the front wheels and EMBs mounted at the rear wheels, using CAN communication.

That is, the EWBs mounted at the left front wheel and the right front wheel and the EMB mounted at the left rear wheels and the right rear wheels simultaneously receive initializing signals sent from the ECU and are initialized.

Initializing the EWB is performed in a way of checking whether clamping force is generated while the actuators push and pull wedges forward and backward, and initializing the EMB is performed in a way of checking whether clamping force is generated while the actuators move forward/backward pistons, after a parking unit is disassembled first.

However, according to the initializing types, though short, a time when the clamping force is removed is generated in the EWB and the EMB in the initializing process.

For example, when the wedge is moved forward and then moved backward in initializing the EWB, the wheel disc and the pad are separated, such that clamping force is instantaneously removed, while the parking unit is disassembled first in initializing the EMB, such that clamping force is instantaneously removed.

In the initializing process described above, as all the clamping force is removed in the EWB and EMB, though short, a time when the entire braking force of the vehicle is removed is generated.

When the vehicle is on a level ground, the vehicle is not moved unless the driver intends, even if the entire braking force of the vehicle is removed, such that the vehicle is under the control of the driver.

However, the removal of entire braking force of a vehicle increases a danger in which the vehicle may move even without the driver's intention, in accordance with the road conditions, such that the vehicle is likely to unexpectedly come out of the control of the driver and embarrass the driver.

For example, when the entire braking force of a vehicle is removed on not a level ground, but a slope even with a little inclination, the vehicle comes out of the control of the driver by being pushed forward or backward by the gravity, even without the driver's intention, such that the driver feels embarrassed and uneasy.

A BBW (Brake-by-wire System) in accordance with embodiments of the present invention is applied includes: EWBs (Electro Wedge Brake) that are mounted at the left/right front wheels and generate clamping force in wedge structures that make self-energizing by actuators; EMBs (Electro Mechanical Brake) that are mounted at the left/right rear wheels and generate clamping force, using pistons operated by actuators; and an ECU that processes a variety of sensor information, including an operational signal of an electronic pedal, and controls the EWB and EMB in CAN communication.

FIG. 1 is a flowchart illustrating a method of initializing a BBW according to an embodiment of the present invention.

As in a step S10, when a BBW starts to be initialized to diagnose breakdown of an actuator and compensate pad wear, the ECU determines a TS (Time Sequence) for the order of initializing and EWB and an EMB, as in step S20.

The time sequence TS depends on the inclination conditions of a road, such as an uphill or a downhill, and the ECU determines inclination of a vehicle, using information from a sensor, such as a gravity sensor, in order to determine the inclination conditions of the road.

The time sequence TS that is divided in this embodiment is a front wheel-rear wheel separate type TS, a front wheel-rear wheel X-type TS, and a front wheel-rear wheel simultaneous type TS. The front wheel-rear wheel separate type TS and the front wheel-rear wheel X-type TS are performed for an inclined road, while the front wheel-rear wheel simultaneous type TS is performed for a road without inclination, such as a level ground.

For example, when an engine is disposed at the front portion, the front wheel-rear wheel separate type TS is implemented for an uphill and the front wheel-rear wheel X-type TS is implemented for a downhill, but they are implemented in the opposite way when the engine is mounted at the rear portion.

The front wheel-rear wheel separate type TS initializes first the EWBs at the left/right front wheels and then initializes the EMB at the left/right rear wheels, the front wheel-rear wheel X-type TS initializes first the EWB at the left front wheel and the EMB at the right rear wheel and then initializes the EWB at the right front wheel and the EMB at the left rear wheel, and the front wheel-rear wheel simultaneous type TS simultaneously initializes the EWBs at the left/right front wheels and the EMBs at the left/right rear wheels.

In the embodiment, front wheel-rear wheel simultaneous type Ts can also be performed for an inclined road, and for this, a function of interrupt determination of the front wheel-rear wheel simultaneous type TS by the ECU according to the driver's selection may be further provided.

An interrupt signal is inputted to the ECU, the ECU performs one of the front wheel-rear wheel separate type TS, front wheel-rear wheel X-type TS, and front wheel-rear wheel simultaneous type TS.

An initializing operation according to the front wheel-rear wheel separate type TS is described hereafter.

When the front wheel-rear wheel separate type TS is applied, as in the step S30, the EWBs at the left/right front wheels are initialized, while the EMBs at the left/right rear wheels are not initialized, such that clamping force is maintained.

Therefore, minimum braking force of the vehicle can be maintained, even though the front wheel-rear wheel separate type TS is performed.

When the EWBs at the left/right front wheels are initialized, as in step S31, actuators are operated to move forward wedges, such that pads press wheel discs, as in step S31a.

The forward movement of the wedges implies forward braking.

The magnitude of clamping force generated by the forward movement of the wedges is measured, as in step S31b, and it is determined whether the measured magnitude of the clamping force is satisfied, as in step S31c.

The magnitude of the clamping force is measured by a sensor.

Unsatisfied magnitude of the clamping force measured when the wedges are moved forward implies excess of a reference gap due to pad wear, such that the process feedbacks to step S31a, but satisfaction of the measure clamping force implies satisfaction of the reference gap of the pad, such that the process goes to the next step.

Pad wear is compensated by making the initial position of the air gap, using the adjustment.

Step S31d is a process of pressing the wheel discs with the pads once more by pulling the wedges backward, after the clamping force measured when the wedges are moved forward is satisfied.

The backward movement of the wedges implies backward braking.

The backward movement of the wedges instantaneously removes the clamping force by separating the pads and the wheel discs.

Step S31e is a process of determining whether normal operation is made when the wedges are moved backward, in which when it is determined that the backward operation of the wedges is insufficient, the process feedbacks to step S31d, but when it is determined that the operation is satisfied, the wedges are moved to the neutral position, as in step S31f.

Whether the wedges are moved backward is detected by a sensor.

The initialization is finished with return of the wedges to the neutral position, as in step S31g, clamping force is generated at the left/right front wheels, as in step 31h, such that braking force of the vehicle is maintained.

As described above, when the EWBs at the left/right front wheels are finished being initialized, the EMBs at the left/right rear wheels start to be initialized.

Figure 2:
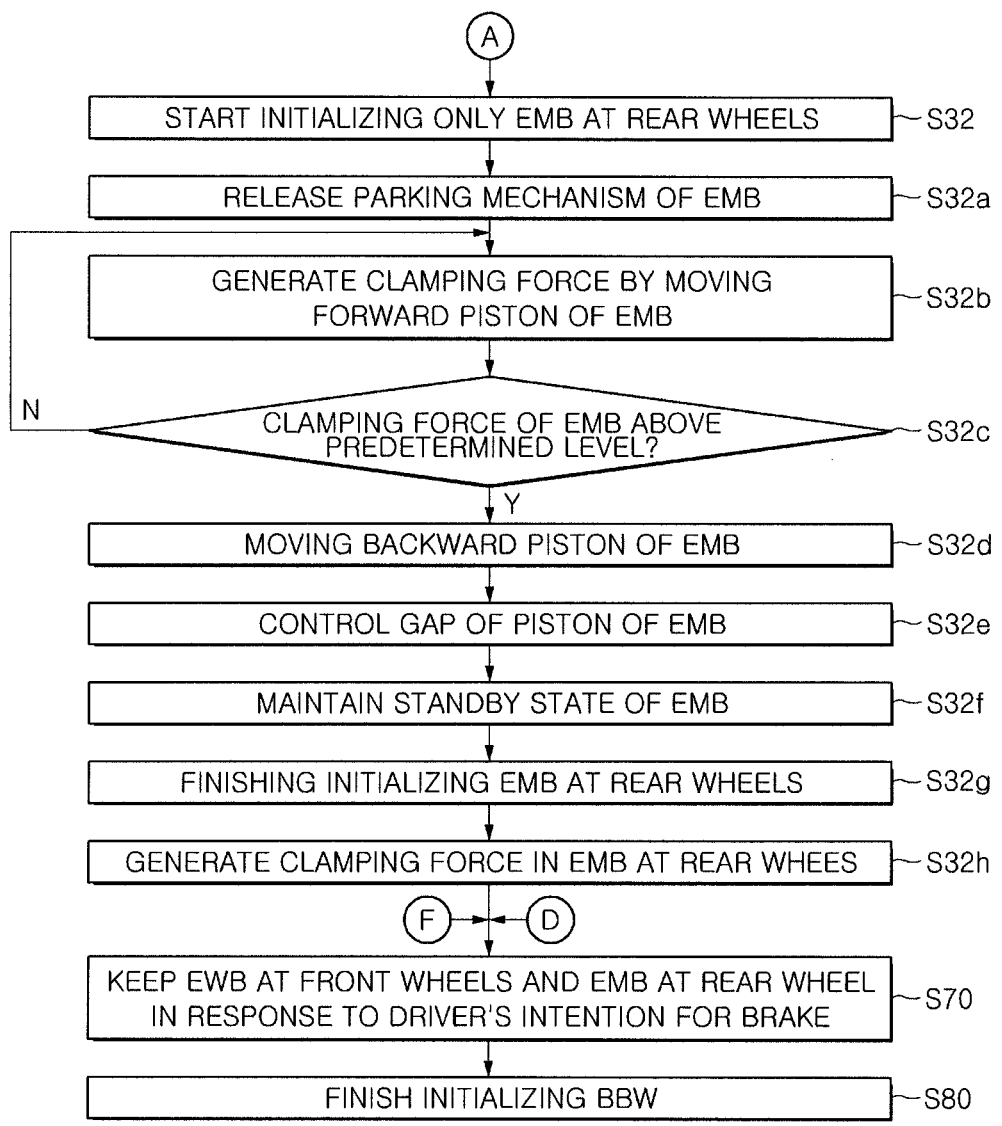

FIG. 2 is a diagram illustrating a process of initializing the EMBs at the left/right rear wheels according to the embodiment of the present invention.

When the EMBs at the left/right rear wheels are initialized, as in step S32, a parking mechanism is released first, as in step S32a, and pistons are moved forward, as in step S32b, thereby generating clamping force.

After the pistons are moved forward, it is determined whether the measured magnitude of the clamping force is satisfied, as in step S32c, and if it is dissatisfied, the process feedbacks to step S32b, but if it is satisfied, the pistons are moved backward, as in step S32d.

The backward movement of the pistons separate the pads and wheel discs, such that the clamping force is removed.

After the pistons are moved backward, when the pistons that have been moved backward do not satisfy the initial position of the air gap, piston gap control is performed, as in step S32e, thereby making the initial position of the air gap.

The positions of the pistons are detected by a sensor.

When the gap control of the pistons is finished, the EMBs are switched to the standby state and the initialization is finished, as in steps S32f and S32g, and the EWBs at the left/right front wheels and the EMBs at the left/right rear wheels are switched to the state in which clamping force is generated, as in step S32h.

In this state, the parking mechanism that has been released returns to the state before released.

As described above, as the initialization of the EWBs at the left/right front wheels and the EMBs at the left/right rear wheels is finished with a time difference, the EWBs at the left/right front wheels and the EMBs at the left/right rear wheels are switched to brake by a pedal, as in step S70, which means that all the initialization applied to the front wheel-rear wheel separate type TS is finished, as in step S80.

Figure 6:
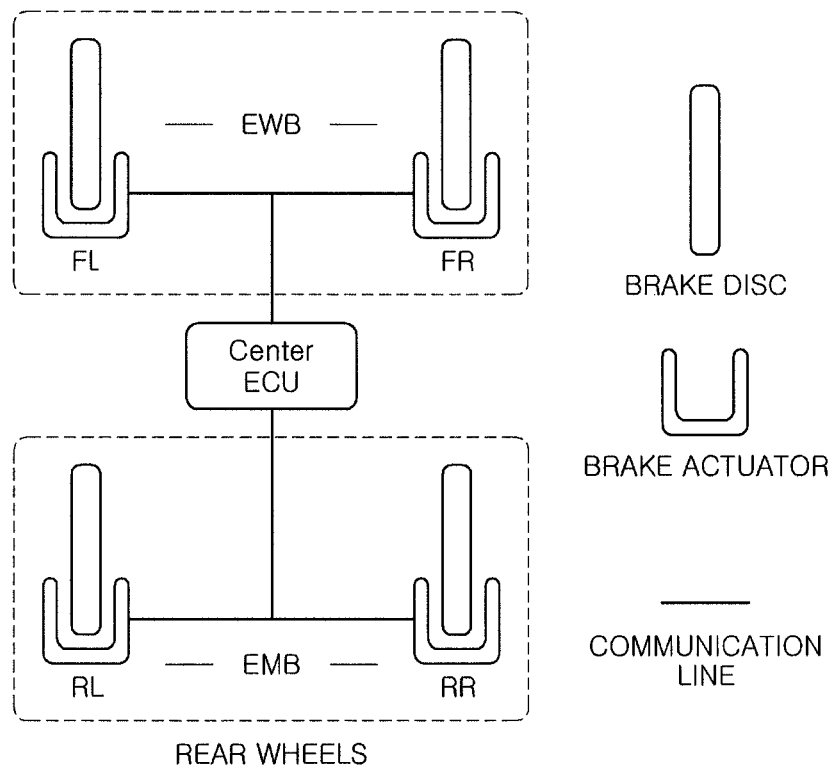

FIG. 6 shows a brake-by-wire system that is initialized by the front wheel-rear wheel separate type time sequence according to the embodiment of the present invention.

As shown in the figure, the front wheel-rear wheel separate type TS performs initialization with a time difference, independently at the front wheels and the rear wheels, by finishing initializing the EMBs at the left/right rear wheels, after finishing initializing the EWBs at the left/right front wheels.

As described above, the initialization by the front wheel-rear wheel separate type TS according to the embodiment is finished, any one of the EWBs at the left/right front wheels or the EMBs at the left/right rear wheels maintains the clamping force under any circumstances, such that not all clamping force of the vehicle is removed.

Figure 3:
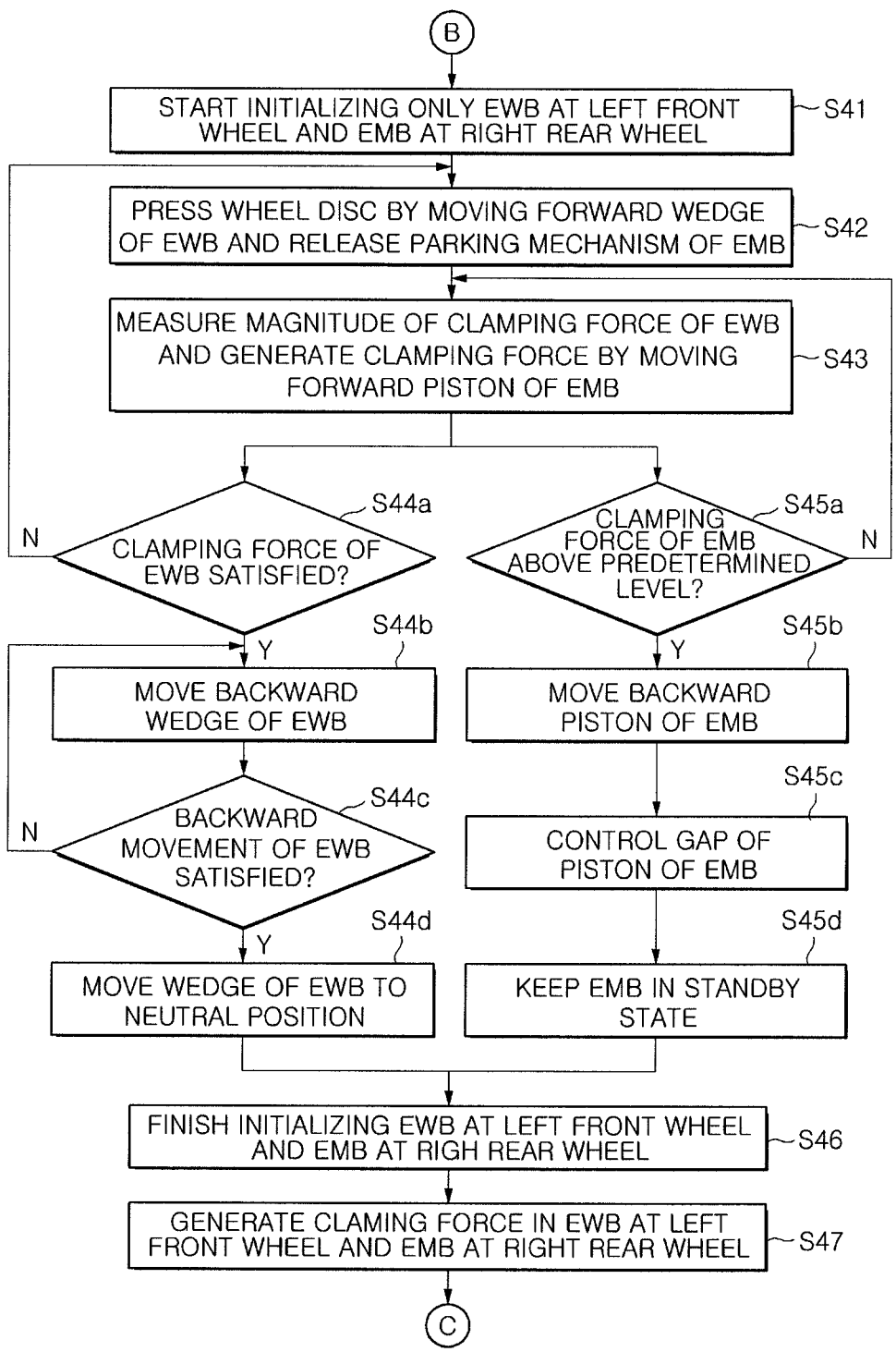
FIGS. 3 and 4 are front wheel-rear wheel X-type time sequence flowcharts in initializing the brake-by-wire system according to the embodiment of the present invention.

FIG. 3 is a flowchart illustrating a front wheel-rear wheel X-type time sequence TS in initializing the brake-by-wire system according to the embodiment of the present invention.

The front wheel-rear wheel X-type TS is performed in step S40, the EWB at the left front wheel and the EMB at the right rear wheel are simultaneously initialized, as in step S41, while the EWB at the right front wheel and the EMB at the left rear wheel are not initialized, such that clamping force is maintained.

Therefore, minimum braking force of the vehicle can be maintained, even though the front wheel-rear wheel X-type TS is performed.

In the initialization, the wedge is moved forward by the actuator and the pad presses the wheel disc at the EWB at the left front wheel, as in step S42, and the parking mechanism is released first at the EMB at the right rear wheel.

Further, the magnitude of clamping force generated in the EWB at the left front wheel is measured and the piston is moved forward in the EMB at the right rear wheel, such that clamping force is generated, as in step S43.

Whether the magnitude of the clamping force measured at the EWB at the left front wheel is appropriate is determined in step S44a, and if it is not satisfied, the process feeds back to step S42, while if it is satisfied, reference gap compensation of the pads is not required, such that the process goes to the next step S44b.

After the wedge is pulled backward, as in step S44b, whether the wedge operates backward is determined in step S44c, and then if the backward operation of the wedge is not sufficient, the process feeds back to step S42, and if it is satisfied, the wedge is moved to the neutral position, as in step S44d.

The backward movement of the wedges instantaneously removes the clamping force by separating the pads and the wheel discs.

Whether the magnitude of the clamping force generated as in step S45a is satisfied is determined, in the EMB at the right rear wheel, with the piston moved forward in step S43, and then if it is not satisfied, the process feeds back to step S43, while if it is satisfied, the piston is moved backward, as in step S45b.

After the pistons are moved backward, when the pistons that have been moved backward do not satisfy the initial position of the air gap, piston gap control is performed, as in step S45c, thereby making the initial position of the air gap.

The backward movement of the pistons separates the pads and wheel discs, such that the clamping force is instantaneously removed.

When gap control of the piston is finished, the EMB is switched to the standby state, as in step S45d.

When all of the EWB at the left front wheel and the EMB at the right rear wheel is finished being initialized, as in step S46, clamping force is generated in the EWB at the left front wheel and the EMB at the right rear wheel in step S47.

In this state, the parking mechanism that has been released returns to the state before released.

Figure 4:
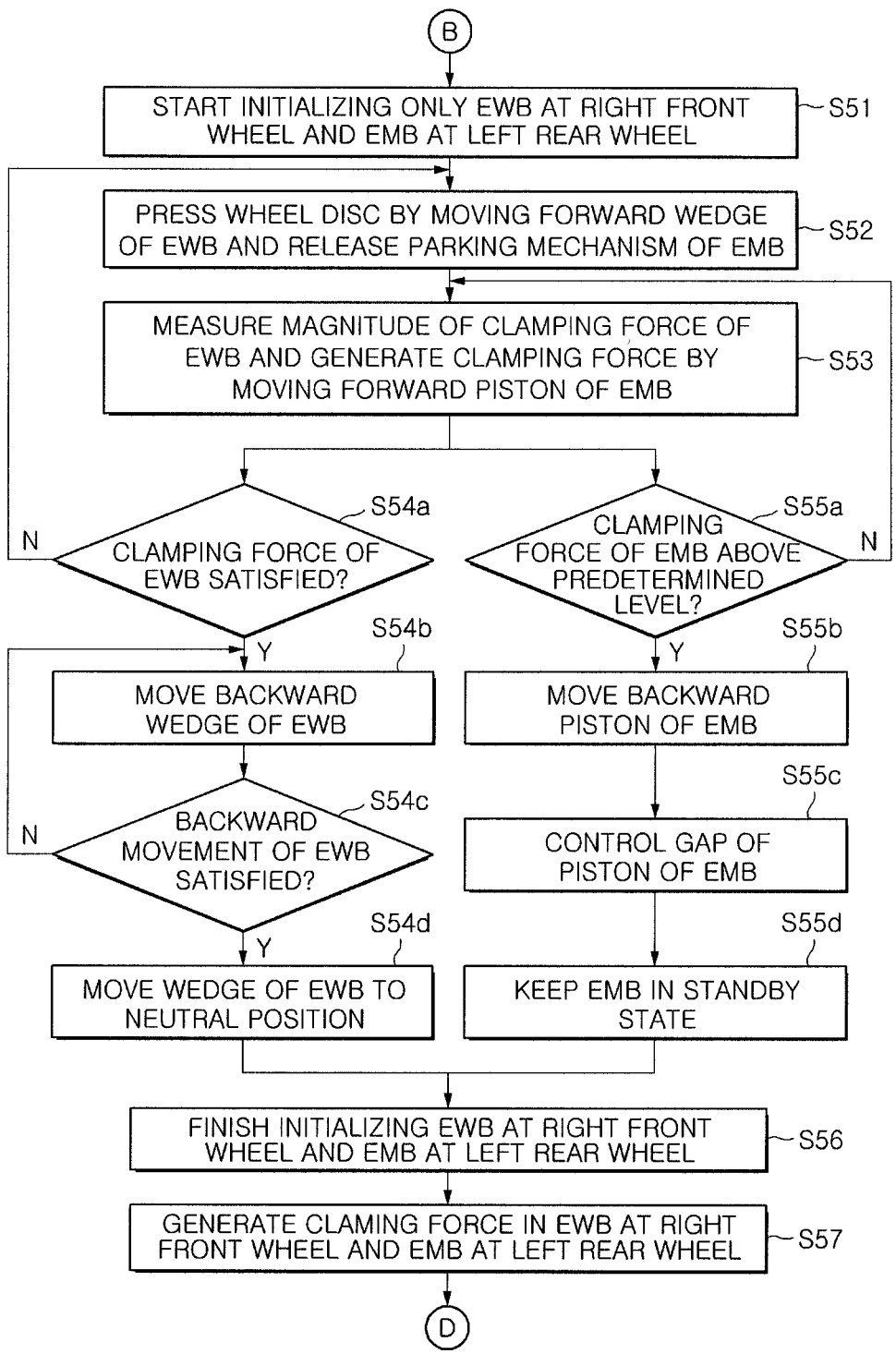

The initialization is for the EWB at the left front wheel and the EMB at the right rear wheel, such that the same initialization is performed for the EWB at the right front wheel and the EMB at the left rear wheel, as shown in FIG. 4.

In the initialization, the wedge is moved forward by the actuator and the pad presses the wheel disc at the EWB at the right front wheel, as in step S52, and the parking mechanism is released first at the EMB at the left rear wheel.

Further, the magnitude of clamping force generated in the EWB at the right front wheel is measured and the piston is moved forward in the EMB at the left rear wheel, such that clamping force is generated, as in step S53.

Whether the magnitude of the clamping force measured at the EWB at the right front wheel is appropriate is determined in step S54a, and if it is not satisfied, the process feeds back to step S52, while if it is satisfied, reference gap compensation of the pads is not required, such that the process goes to the next step S54b.

After the wedge is pulled backward, as in step S54b, whether the wedge operates backward is determined in step S54c, and then if the backward operation of the wedge is not sufficient, the process feeds back to step S52, and if it is satisfied, the wedge is moved to the neutral position, as in step S54d.

The backward movement of the wedges instantly removes the clamping force by separating the pads and the wheel discs.

Whether the magnitude of the clamping force generated as in step S55a is satisfied is determined, in the EMB at the left rear wheel, with the piston moved forward in step S53, and then if it is not satisfied, the process feeds back to step S53, while if it is satisfied, the piston is moved backward, as in step S55b.

After the pistons are moved backward, when the pistons that have been moved backward do not satisfy the initial position of the air gap, piston gap control is performed, as in step S55c, thereby making the initial position of the air gap.

The backward movement of the pistons separates the pads and wheel discs, such that the clamping force is removed.

When gap control of the piston is finished, the EMB is switched to the standby state, as in step S55d.

When all of the EWB at the right front wheel and the EMB at the left rear wheel is finished being initialized, as in step S56, clamping force is generated in the EWB at the right front wheel and the EMB at the left rear wheel in step S57.

In this state, the parking mechanism that has been released returns to the state before released.

As described above, when the EWB at the right front wheel and the EMB at the left rear wheel are all finished being initialized, with a time difference from the initialization of the EWB at the left front wheel and the EMB at the right rear wheel, as in step S70 of FIG. 2, the EWBs at the left/right front wheels and the EMBs at the left/right rear wheels are switched to brake by a pedal, which means that all the initialization by the front wheel-rear wheel X-type TS is finished, as in step S80.

Figure 7:
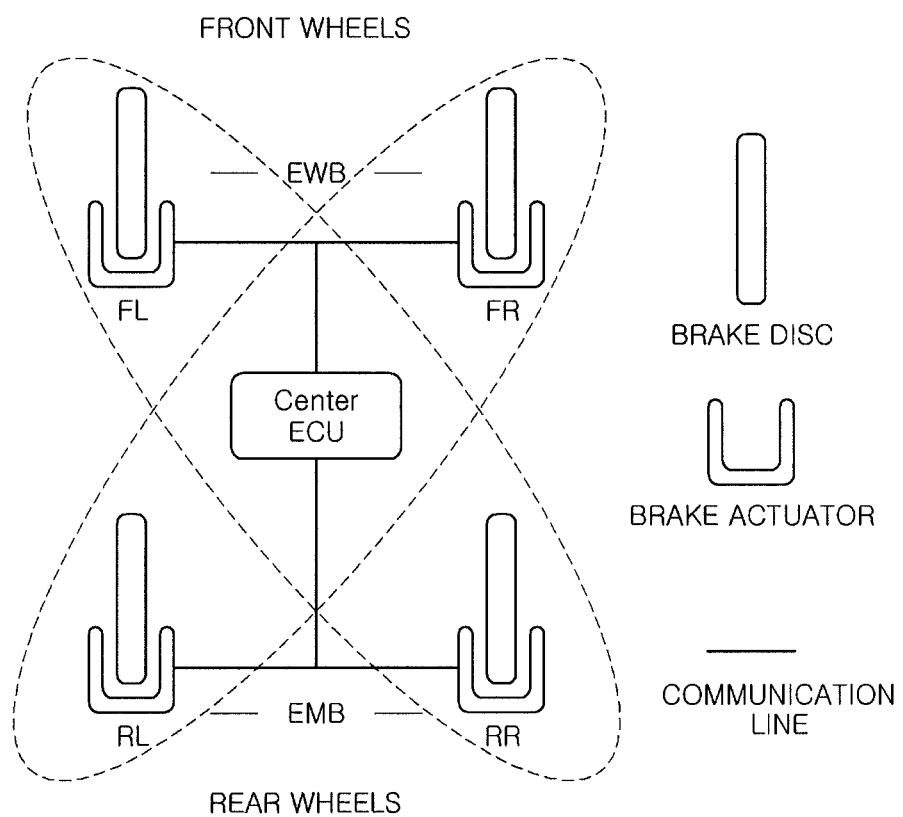

FIG. 7 shows a brake-by-wire system that is initialized by the front wheel-rear wheel X-type time sequence according to the embodiment of the present invention.

As shown in the figure, the front wheel-rear wheel X-type TS performs initialization with a time difference, independently at the front wheels and the rear wheels, by finishing initializing the EWB at the right front wheel and the EMB at the left rear wheel, after finishing initializing the EWB at the left front wheel and the EMB at the right rear wheel.

As described above, the initialization by the front wheel-rear wheel X-type TS according to this embodiment is finished, any one of the EWB at the left front wheel and the EMB at the right rear wheel or the EWB at the right front wheel and the EMB at the left rear wheel maintains the clamping force under any circumstances, such that not all braking force of the vehicle is removed.

Figure 5:
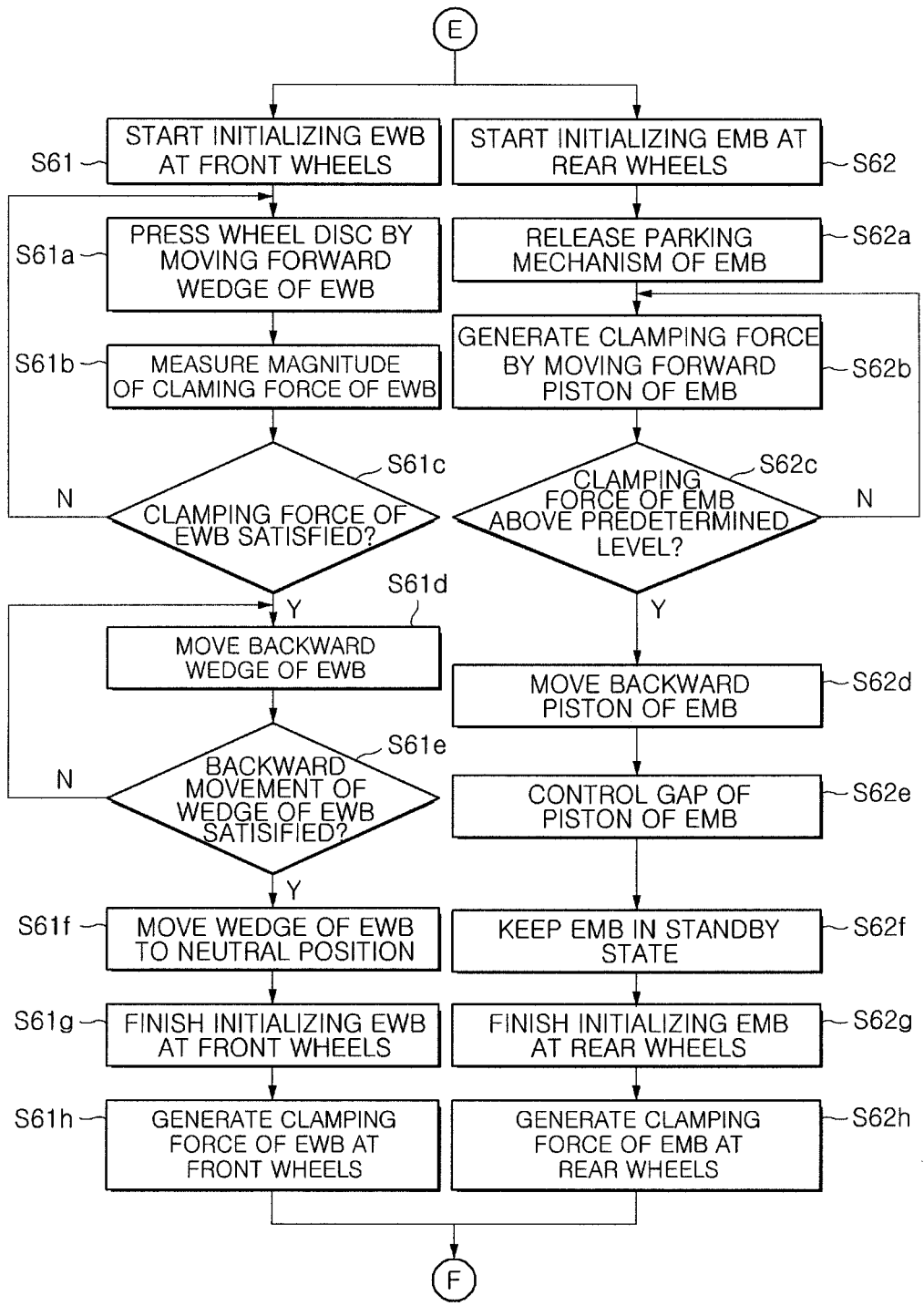
FIG. 5 is a front wheel-rear wheel simultaneous type time sequence flowchart in initializing the brake-by-wire system according to the embodiment of the present invention.

FIG. 5 shows a brake-by-wire system that is initialized by the front wheel-rear wheel simultaneous type time sequence according to the embodiment of the present invention.

The initialization using the front wheel-rear wheel simultaneous type TS cannot maintain the minimum clamping force for the braking force of a vehicle, because the EWBs at the left/right front wheels and the EMBs at the left/right rear wheels are simultaneously performed, such that the front wheel-rear wheel simultaneous type Ts is applied only to a road without inclination, such as a level ground.

Actually, the front wheel-rear wheel simultaneous type Ts may not be applied, regardless of the road conditions.

When the front wheel-rear wheel simultaneous type Ts is applied, the EWBs at the left/right front wheels and the EMBs at the left/right rear wheels are simultaneously initialized, as in steps S61 and S62.

In the initialization of the EWBs at the left/right front wheels, the actuator moves forward the wedge and the pad presses the disc, thereby generating clamping force, as in step S61a.

It is determined that the magnitude of the clamping force measured in step S61b satisfied, as in step 61c, and it is not satisfied, it implies excess of a reference gap due to wear of the pad, such that the process feeds back to step S61a, while if it is satisfied, the wedge is pulled backward, as in step 61d, the wheel disc is pressed by the pad once more.

The backward movement of the wedges removes the clamping force by separating the pads and the wheel discs.

Step S61e is a process of determining whether normal operation is made when the wedges are moved backward, in which when it is determined that the backward operation of the wedges is insufficient, the process feedbacks to step S61d, but when it is determined that the operation is satisfied, the wedges are moved to the neutral position, as in step S61f.

The initialization is finished with return of the wedges to the neutral position, as in step S61g, clamping force is generated in the EWBs at the left/right front wheels, as in step 61h, such that braking force of the vehicle is maintained.

In the initialization of the EMBs at the left/right rear wheels, the parking mechanism is released first, as in step S62a, and the piston is moved forward, as in step S62b, thereby generating clamping force.

After the pistons are moved forward, it is determined whether the measured magnitude of the clamping force is satisfied, as in step S62c, and if it is dissatisfied, the process feedbacks to step S62b, but if it is satisfied, the pistons are moved backward, as in step S62d.

After the pistons are moved backward, when the pistons that have been moved backward do not satisfy the initial position of the air gap, piston gap control is performed, as in step S62e, thereby making the initial position of the air gap.

The backward movement of the pistons separates the pads and wheel discs, such that the clamping force is removed.

When the gap control of the pistons is finished, the EMBs are switched to the standby state and the initialization is finished, as in steps S62f and S62g, and then clamping force is generated in the EWBs at the left/right front wheels and the EMBs at the left/right rear wheels, as in step S62h.

In this state, the parking mechanism that has been released returns to the state before released.

As described above, as the simultaneous initialization of the EWBs at the left/right front wheels and the EMBs at the left/right rear wheels is finished, the EWBs at the left/right front wheels and the EMBs at the left/right rear wheels are switched to brake by a pedal, as in step S70 of FIG. 2, which means that all the initialization applied to the front wheel-rear wheel simultaneous type TS is finished, as in step S80.

FIG. 8 shows a brake-by-wire system that is initialized by the front wheel-rear wheel simultaneous type time sequence according to an embodiment of the present invention.

As shown in FIG. 8, the front wheel-rear wheel simultaneous type TS cannot maintain the minimum clamping force for braking force of a vehicle because it simultaneously performs and finishes initialization of the EWBs at the left/right front wheels and the EMBs at the left/right rear wheels, which causes the problems as in the related art.

However, since the front wheel-rear wheel simultaneous type TS is applied only to a road without inclination, such as a level ground, in this embodiment, the problems as in the related art are not caused, even if the EWBs at the left/right front wheels and the EMBs at the left/right rear wheels are simultaneously initialized.

The foregoing descriptions of specific embodiments of the present invention have been presented for purposes of illustration and description. They are not intended to be exhaustive or to limit the invention to the precise forms disclosed, and obviously many modifications and variations are possible in light of the above teachings. The embodiments were chosen and described in order to explain certain principles of the invention and their practical application, to thereby enable others skilled in the art to make and utilize various embodiments of the present invention, as well as various alternatives and modifications thereof. It is intended that the scope of the invention be defined by the Claims appended hereto and their equivalents.

What is claimed is:

1. A method of controlling a brake-by-wire system of a vehicle, the method comprising:
providing a brake-by-wire system comprising a plurality of electrically controlled brakes, wherein the plurality of electrically controlled brakes comprises a first brake installed on a first wheel, a second brake installed on a second wheel, a third wheel installed on a third wheel and a fourth brake installed on a fourth wheel, wherein the first and second wheels are front wheels of a vehicle and the third and fourth wheels are rear wheels of the vehicle;
determining whether the vehicle is on a slope; and
when determined that the vehicle is on a slope, initializing two of the brakes among the first, second, third and fourth brakes while the other two brakes maintain braking of the corresponding wheels, wherein the vehicle comprises an engine located at a front location of the vehicle, wherein determining comprises determining whether the vehicle is on an uphill slope or a downhill slope, wherein, when determined that the vehicle is on the uphill slope, the first and second brakes installed in the front wheels are initialized before the third and fourth brakes are initialized, wherein, when determined that the vehicle is on the downhill slope, the first and third brakes are initialized before the second and fourth brakes are initialized, wherein the first and third brakes are diagonally arranged and the second and fourth brakes are diagonally arranged.

2. The method of claim 1, wherein, when determined that the vehicle is not on a slope, the first, second, third and fourth brakes are initialized at the same time.

3. The method of claim 1, wherein, when determined that the vehicle is on the uphill slope, the first and second brakes installed on the front wheels are initialized while the third and fourth brakes installed on the rear wheels maintain the braking of the corresponding wheels.

4. The method of claim 1, wherein, when determined that the vehicle is on the downhill slope, the first and third brakes are initialized while the second and fourth brakes maintain the braking of the corresponding wheels.

5. The method of claim 1, wherein each of the first and second brakes comprises an Electro Wedge Brake (EWB).

6. The method of claim 1, wherein each of the third and fourth brakes is of an Electro Mechanical Brake (EMB).

7. The method of claim 1, wherein initializing of one of the brakes comprises releasing the braking of the corresponding wheel.

8. The method of claim 1, wherein initializing of one of the brakes comprises separating a brake pad from a brake disc of the brake.

9. The method of claim 1, wherein initializing of one of the brakes comprises adjusting a gap between a brake pad and a brake disc of the brake.

10. The method of claim 1, wherein initializing of one of the brakes comprises measuring clamping force of the brake.

11. The method of claim 1, wherein the operation of a brake pedal by a driver is applied to the brake-by-wire system after completion of initializing of the brakes.

12. The method of claim 1, wherein initializing of the first brake comprises separating a brake pad from a brake disc of the first brake.

13. The method of claim 1, wherein initializing of the first brake comprises adjusting a gap between a brake pad and a brake disc of the first brake.

14. A method of controlling a brake-by-wire system of a vehicle, the method comprising:

providing a brake-by-wire system comprising a plurality of electrically controlled brakes, wherein the plurality of electrically controlled brakes comprises a first brake installed on a first wheel, a second brake installed on a second wheel, a third wheel installed on a third wheel and a fourth brake installed on a fourth wheel, wherein the first and second wheels are front wheels of a vehicle and the third and fourth wheels are rear wheels of the vehicle;

determining whether the vehicle is on a slope; and when determined that the vehicle is on a slope, initializing two of the brakes among the first, second, third and fourth brakes while the other two brakes maintain braking of the corresponding wheels, wherein the vehicle comprises an engine located at a rear location of the vehicle, wherein determining comprises determining whether the vehicle is on an uphill slope or a downhill slope, wherein, when determined that the vehicle is on the downhill slope, the first and second brakes are initialized after the third and fourth brakes are initialized, wherein, when determined that the vehicle is on the uphill slope, the first and third brakes are initialized after the second and fourth brakes are initialized, wherein the first and third brakes are diagonally arranged and the second and fourth brakes are diagonally arranged.

* * * * *